(12) United States Patent
Novick et al.

(10) Patent No.: US 7,773,458 B2
(45) Date of Patent: Aug. 10, 2010

(54) SYSTEMS AND METHODS FOR DETECTION AND ANALYSIS OF AMPLITUDE MODULATION OF UNDERWATER SOUND

(75) Inventors: Arnold W. Novick, Providence, RI (US);
Michael F. Janik, Portsmouth, RI (US);
Ian B. Kerfoot, Middletown, RI (US);
Mary Kerfoot, legal representative, Schaumburg, IL (US)

(73) Assignee: Raytheon Company, Waltham, MA (US)

( * ) Notice: Subject to any disclaimer, the term of this patent is extended or adjusted under 35 U.S.C. 154(b) by 344 days.

(21) Appl. No.: 12/040,123

(22) Filed: Feb. 29, 2008
(Under 37 CFR 1.47)

(65) Prior Publication Data
US 2009/0122649 A1 May 14, 2009

Related U.S. Application Data

(60) Provisional application No. 60/894,317, filed on Mar. 12, 2007.

(51) Int. Cl.
*G01S 3/808* (2006.01)
(52) U.S. Cl. ............... 367/123; 367/125; 367/126; 367/119
(58) Field of Classification Search ............... 367/123, 367/125, 119, 126
See application file for complete search history.

(56) References Cited

U.S. PATENT DOCUMENTS

| | | | |
|---|---|---|---|
| 4,312,053 A | 1/1982 | Lipsky | |
| 4,473,896 A | 9/1984 | Loeser et al. | |
| 5,175,710 A | 12/1992 | Hutson | |
| 5,218,359 A | 6/1993 | Minamisono | |
| 5,305,286 A | 4/1994 | Woodsum et al. | |
| 5,357,484 A | 10/1994 | Bates et al. | |
| 5,420,827 A | 5/1995 | Feintuch | |
| 6,160,758 A | 12/2000 | Spiesberger | |

(Continued)

FOREIGN PATENT DOCUMENTS

EP  1 127 175 A1  1/2003

(Continued)

OTHER PUBLICATIONS

Papadopoulos et al.; "Implementation of an Intelligent Instrument for Passive Recognition and Two-Dimensional Location Estimation of Acoustic Targets;" IEEE Transactions on Instrumentation and Measurement, vol. 41, No. 6; Dec. 1992; pp. 885-890.

(Continued)

*Primary Examiner*—Dan Pihulic
(74) *Attorney, Agent, or Firm*—Daly, Crowley, Mofford & Durkee, LLP

(57) ABSTRACT

Systems and methods for detection and analysis of amplitude modulation of underwater sound employ a product of a time delayed first electrical signal with a second electrical signal to generate a summed-product signal. The time delayed first electrical signal and the second electrical signal have an amplitude modulation indicative of characteristics of a vessel propeller. The summed-product signal is analyzed to detect a vessel and to determine the characteristics of the vessel propeller. In some arrangements a plurality of summed-product signals are analyzed to also determine a depth of the detected vessel.

24 Claims, 5 Drawing Sheets

U.S. PATENT DOCUMENTS

| | | | |
|---|---|---|---|
| 6,288,973 | B1 | 9/2001 | Joynes |
| 6,307,810 | B1 | 10/2001 | Shany et al. |
| 6,400,647 | B1 | 6/2002 | Huntress |
| 6,466,891 | B1 | 10/2002 | Carter et al. |
| 7,266,042 | B1 | 9/2007 | Gent et al. |
| 7,315,488 | B2 | 1/2008 | Novick et al. |
| 2001/0019516 | A1 | 9/2001 | Wake et al. |
| 2003/0223311 | A1 | 12/2003 | Breed et al. |
| 2006/0133211 | A1 | 6/2006 | Yang |
| 2009/0122649 | A1* | 5/2009 | Novick et al. ............... 367/119 |

FOREIGN PATENT DOCUMENTS

| | | |
|---|---|---|
| GB | 1 430 051 | 3/1976 |
| WO | WO 2007/145761 A2 | 12/2007 |
| WO | WO 2007/145761 A3 | 12/2007 |
| WO | WO 2008112445 A * | 9/2008 |

OTHER PUBLICATIONS

PCT Search Report of the ISA for PCT/US2008/055445 dated Jul. 9, 2008.

PCT Written Opinion of the ISA for PCT/US2008/055445 dated Jul. 9, 2008.

Morgera et al.; "Source-Oriented Adaptive Beamforming;" Circuits Systems Signal Process, vol. 2, No. 4; XP008108350; Dec. 1983; pp. 487-516.

Spiesberger; "Finding the right cross-correlation peak for locating sounds in multipath environments with a fourth-moment function;" J. Acoust, Soc. Am.; vol. 108 (3), Pt. 1; Sep. 2000; pp. 1349-1352.

Spiesberger; "Identifying cross-correlation peaks due to multipaths with application to optimal passive localization of transient signals and tomographic mapping of the environment;" J.Acoust. Soc. Am.; vol. 100 (2), Pt. 1; Aug. 1996; pp. 910-917.

Speisberger; "Linking auto- and cross-correlation functions with correlation equations: Application to estimating the relative travel times and amplitudes of multipath;" J. Acoust. Soc. Am.; vol. 104 (1); Jul. 1998; pp. 300-312.

PCT International Preliminary Report on Patentability and Written Opinion of the International Bureau dated Dec. 14, 2009 for PCT/US2007/011653 filed on May 15, 2007.

PCT International Search Report & Written Opinion of the ISA dated Apr. 1, 2008 for PCT/US2007/011653 filed on May 15, 2007.

PCT International Search Report & Written Opinion of the IDS dated Jun. 25, 2008 for PCT/US2008/054076 filed on Feb. 15, 2008.

PCT International Search Report and Written Opinion of the ISA dated Jul. 22, 2009 for PCT/US2009/036731 filed on Mar. 11, 2009.

Image File Wrapper downloaded from PAIR on Mar. 11, 2009, for U.S. Appl. No. 11/422,435, filed on Jun. 6, 2006; 138 pages.

Image File Wrapper downloaded from PAIR on Mar. 11, 2009, for U.S. Appl. No. 11/683,712, filed on Mar. 8, 2007; 236 pages.

Notification Concerning Transmittal of International Preliminary Report on Patentability (Chapter 1 of the Patent Cooperation Treaty), PCT/US2008/055445 dated Sep. 24, 2009, 2 pages.

Written Opinion of the International Searching Authority, PCT/US2008/055445 dated Sep. 24, 2009, 6 pages.

* cited by examiner

SYSTEMS AND METHODS FOR DETECTION AND ANALYSIS OF AMPLITUDE MODULATION OF UNDERWATER SOUND

CROSS REFERENCE TO RELATED APPLICATION

This application claims the benefit under 35 U.S.C. §119(e) of U.S. Provisional Application No. 60/894,317, filed on Mar. 12, 2007, which application is incorporated herein by reference in its entirety.

FIELD OF THE INVENTION

This invention relates generally to sonar systems and methods and, more particularly, to sonar systems and methods used to analyzes an amplitude modulation of underwater sound resulting from propeller rotation of a water born vessel.

BACKGROUND OF THE INVENTION

Some passive sonar systems are designed to receive and process underwater sound signals emitted by an unknown water born vessel. The sound signals can be active sound pulses emitted by an active sonar system on board the unknown vessel, or vessel noise (e.g., engines, generators, and the like). The passive sonar systems can receive a combination of ambient ocean noise and the vessel-generated sound signals. The passive sonar systems can employ a variety of processing upon the received sound signals in order to detect, to localize, and to classify the unknown vessel.

Some sounds in the water tend to be amplitude modulated by the sound field emitted by the vessel's propellers. In particular, the sound received by the passive sonar system can be amplitude modulated in a manner related to characteristics of the propeller.

Some passive sonar systems have exploited the amplitude modulation of the received sound in order to identify characteristics of the propeller, for example, rotation speed and number of propeller blades. With this information, the passive sonar systems are often able classify the type of vessel, including, but not limited to, whether the vessel is a surface vessel or a submarine. The processing can be of a type referred to as "detection of envelope modulation on noise."

Referring to FIG. 1, a conventional "detection of envelope modulation on noise" system 10 includes a hydrophone 14 adapted to receive underwater sound 12. The hydrophone 14 is conventionally an omnidirectional hydrophone, which has substantially the same sensitivity to sound received from all spatial directions. The hydrophone 14 generates a signal in response to the sound signal 12. The signal is preprocessed, for example, by an amplifier 16. The amplifier 16 is coupled to an analog to digital (A/D) converter 18, which generates a signal x(t), which is comprised of digital time samples of the preprocessed signal.

The signal x(t) can be processed to identify the above-described amplitude modulation of the received sound 12. One of ordinary skill in the art will recognize a variety of circuits that can be used to identify the amplitude modulation of the received sound 12. In one conventional arrangement, the signal x(t) can be processed by a "square law" detector, including a squaring module 20 and a low pass filter (LPF) module 22. An output signal generated by the low pass filter 22 is representative of the envelope of (i.e., the amplitude modulation of) the received sound signal 12.

The output signal generated by the low pass filter module 22 can be analyzed by a spectrum analyzer 24, for example, a Discrete Fourier Transform (DFT). It will be understood that the spectrum analyzer 24 provides a frequency domain signal (e.g., one or more frequency spectra) representative of frequency content of the envelope of the received sound signal 12. The frequency spectra generated by the spectrum analyzer 24 can be further processed and displayed by a detector/display module 26. For example, the detector/display module 26 can display the frequency spectra in a waterfall type display (not shown). The detector/display module 26 can also detect and analyze spectral lines present in the frequency spectra.

It is possible to determine a propeller shaft rate (revolutions per second (rps)) and a number of propeller blades of a detected vessel by analyzing the frequency spectra. From the shaft rate and the number of propeller blades it is often possible to identify the type of vessel and whether the vessel is a surface vessel or a submarine.

In general, a fundamental frequency of the frequency domain signal (frequency spectra) generated by the spectrum analyzer 24 in Hz corresponds to the propeller shaft rate of the unknown vessel in revolutions per second. Furthermore, the number of propeller blades can be determined from frequencies and relative amplitudes of harmonic signal components in the frequency domain signal generated by the spectrum analyzer 24.

The "detection of envelope modulation on noise" system and methods described above are often able to detect and to classify a vessel. However, in general, it is always desirable to improve detection performance, localization performance, and/or classification performance of a sonar system.

SUMMARY OF THE INVENTION

The present invention can provide improved detection performance, localization performance, and/or classification performance compared with a conventional "detection of envelope modulation on noise" arrangement.

In accordance with one aspect of the present invention, a method of processing sound includes receiving the sound with one or more sound sensors, converting the received sound to first and second electrical signals, correlating the first and second electrical signals to provide a correlation signal, identifying a peak in the correlation signal, identifying a time delay associated with the peak in the correlation signal, applying the time delay to the first electrical signal to provide a first time-delayed electrical signal, multiplying portions of the second electrical signal by respective portions of the first time-delayed electrical signal to provide respective pluralities of product values, calculating respective sums of each one of the pluralities of product values to provide a plurality of summed values, and converting the plurality of summed values to a frequency domain signal.

In accordance with another aspect of the present invention, apparatus for processing sound includes one or more sound sensors adapted to receive the sound signal. The apparatus further includes a converter coupled to the one or more sound sensors and adapted to convert the received sound to first and second electrical signals, a correlator adapted to correlate the first and second electrical signals to provide a correlation signal, a correlation peak detector adapted to identify a peak and the time delay associated with the peak in the correlation signal, at least one time delay module adapted to apply the time delay to the first electrical signal to provide a first time-delayed electrical signal, at least one multiplication/summing module adapted to multiply portions of the second electrical signal by respective portions of the first time-delayed electrical signal to provide respective pluralities of product values and adapted to calculate respective sums of each one of the pluralities of product values to provide a plurality of summed values; and at least one spectrum analyzer adapted to convert the plurality of summed values to a frequency domain signal.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "spectrum analyzer" is used to describe a circuit or software algorithm, which receives a signal in the time domain and which generates an associated signal in the frequency domain. A spectrum analyzer can include a variety of continuous circuits or discrete circuits (e.g., digital circuits) or algorithms. For example, the spectrum analyzer can include a discrete Fourier transform (DFT) module, which can, in some arrangements, be a fast Fourier transform (FFT) module. It will be recognized that the DFT module can generate a frequency spectrum. In other arrangements, the spectrum analyzer can include one or more multiplication modules, each of which is adapted to multiply the time domain signal by a respective sinusoid signal, resulting in one or more respective product signals. In some particular arrangements, the spectrum analyzer can include at least two multiplication modules, a first one of which is adapted to multiply the time domain signal by a sine signal, resulting in a first product signal, and another one of which is adapted to multiply the time domain signal by a cosine signal, resulting in a second product signal. One of ordinary skill in the art will recognize that the first and second product signals can be combined to generate a magnitude and a phase of a frequency within the time domain signal, wherein the frequency is the frequency of the sine and cosine signals. By performing a plurality of such multiplications, a frequency spectrum can be generated.

Figure 1:
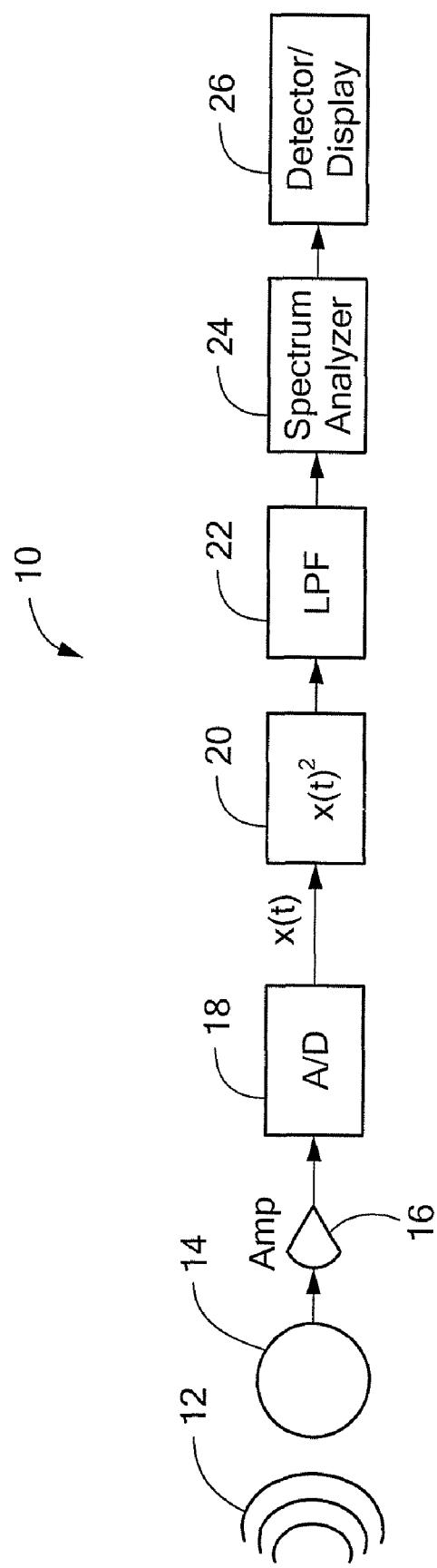
FIG. 1 is a block diagram showing a prior art system having one omnidirectional hydrophone, the system adapted to perform "detection of envelope modulation on noise" processing.
Figure 2:
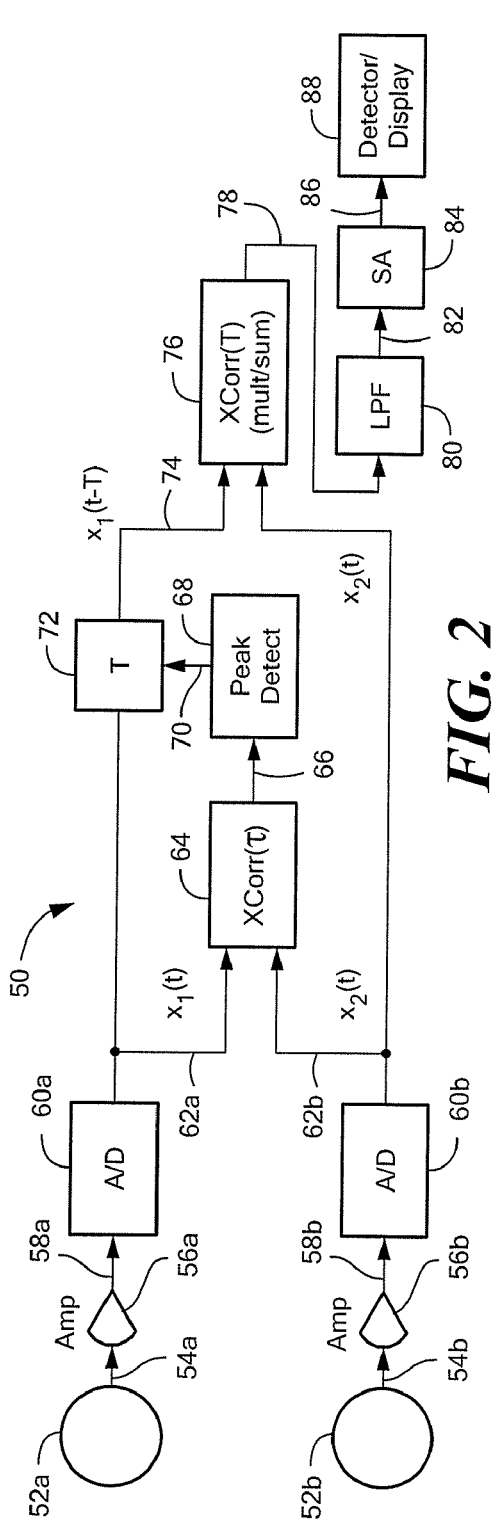
FIG. 2 is a block diagram showing a system having two omnidirectional hydrophones, the system adapted to perform "dual-channel modulation detection" (DCMD)

Referring now to FIG. 2, an exemplary system 50 includes first and second sound sensors 52a, 52b, respectively. The first and second sound sensors 52a, 52b can be omnidirectional hydrophones, each of which has substantially the same sensitivity to sound received from all spatial directions. The first and second sound sensors 52a, 52b can be physically separated by at least a correlation distance, which will be understood by one of ordinary skill in the art. However, in other arrangements, the sound sensors 52a, 52b can be separated by less than a correlation distance.

The first sound sensor 52a generates a signal 54a, which is received by an amplifier 56a. The amplifier 56a generates an amplified signal 58a, which is received by an analog to digital (A/D) converter 60a. The A/D converter 60a generates a first digital signal 62a, which is comprised of digital time samples $x_1(t)$ (referred to herein as a first electrical signal) representative of a sound signal received by the first sound sensor 52a.

The second sound sensor 52b generates a signal 54b, which is received by an amplifier 56b. The amplifier 56b generates an amplified signal 58b, which is received by an analog to digital (A/D) converter 60b. The A/D converter 60b generates a second digital signal 62b, which is comprised of digital time samples $x_2(t)$ (referred to herein as a second electrical signal) representative of a sound signal received by the second sound sensor 52b.

The first and second electrical signals 62a, 62b, respectively, are received by a cross-correlation module 64. The cross-correlation module 64 cross correlates the two signals 62a, 62b resulting in a correlation signal 66.

Cross-correlation of time sampled signal x(t) and y(t) can be described by the following relationship:

$$XCorr(\tau) = 1/N |\Sigma(x(t) * y(t-\tau))|$$

where:

$t = t_1 \ldots t_N$ = time sample times $\tau = \tau_1 \ldots \tau_N$ = Correlation function times (correlation time delays)

N = number of time samples

From the above expression, it should be understood that the time samples 1 to N of the signals x(t) and y(t) are multiplied together and summed at each con-elation time, τ, resulting in one correlation value for each correlation time, τ. The correlation time is then changed and the multiplication and sum is repeated. A plurality of con-elation values are thus obtained, each correlation value associated with a corresponding correlation time.

The correlation signal 66 will be understood to have a time delay scale and an amplitude scale, when graphically represented. In particular, for certain relative time delays applied between the signals $x_1(t)$ and $x_2(t)$, the correlation signal 66 may have relatively high correlation magnitudes, also referred to herein as correlation peaks.

The correlation signal 66 is received by a peak detector module 68, which is operable to identify correlation peaks. In some arrangements, the peak detector module 68 uses a threshold, and portions of the correlation signal 66 that are above the threshold are deemed to be correlation peaks.

The peak detector generates a time delay output signal 70 representative of a time delay used by the cross correlation module 64 that produces the highest magnitude correlation peak in the correlation signal 66. The time delay output signal 70 is received by a time delay module 72, which applies a time delay to the first electrical signal $x_1(t)$ corresponding to the time delay signal 70, in order to generate a time delayed first electrical signal 74, $x_1(t-T)$.

The time delayed first electrical signal 74 and the second electrical signal 62b are received by a cross-correlation module 76. The cross-correlation module 76 operates with only one correlation time delay by the following expression:

$$XCorr(T) = 1/N |\Sigma(x(t) * y(t-T))|$$

where:

t=t$_1$ ... t$_N$=time sample times

T=single time delay T

N=number of time samples

Therefore, the cross-correlation module 76 operates as a multiplication and summing (multiplication/summing) module 76, which multiplies the two signals 74, 62*b*, (e.g., time samples 1 to N), resulting in a plurality of product values, and which sums the plurality of product values, resulting in a summed-product value. The multiplication/summing module 76 repeats the multiplication and summation for other portions (e.g., time samples 10 to N+10, etc.) of the two signals 74, 62*b*, resulting in a summed-product signal 78 having a plurality of summed-product values.

The summed-product signal 78 can be received by an optional low pass filter module 80, which can generate a filtered signal 82. The filtered signal, or in other arrangements, the summed-product signal 78, can be received by a spectrum analyzer 84. The spectrum analyzer 84 can generate a frequency domain signal 86 (or frequency spectrum). A detector/display 88 can receive the frequency domain signal, and can present the frequency domain signal in a display, for example, in a waterfall display.

It will be appreciated that the time delay, T, can be a positive or a negative time delay relative to the second electrical signal 62*b*. It will also be appreciated that a negative time delay, T, applied to the first electrical signal 62*a* is equivalent to a positive time delay applied to the second electrical signal 62*b*. The time delay, T, is shown to be applied to only the first electrical signal 62*a* for clarity.

Figure 2A:
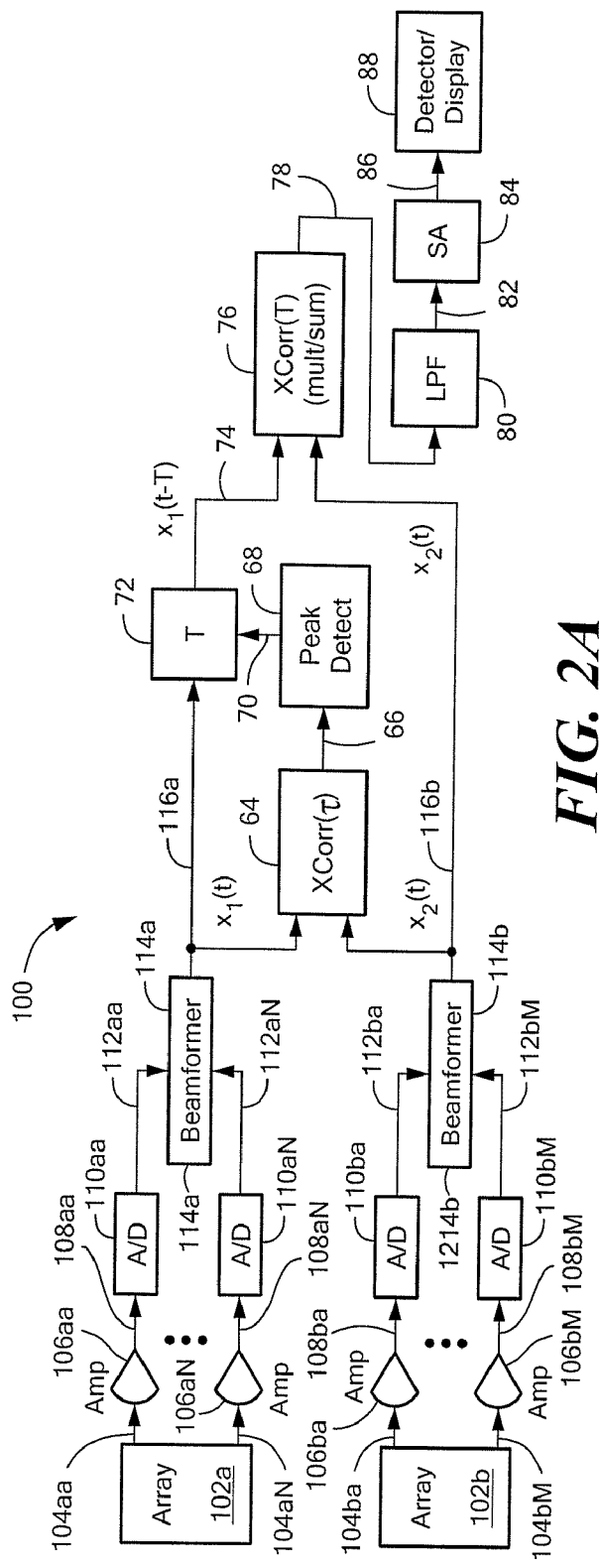
FIG. 2A is a block diagram showing a system having two arrays, the system adapted to perform dual-channel modulation detection (DCMD)

Referring to FIG. 2A, in which like elements of FIG. 2 are shown having like reference designations, a system 100 includes a first array 102*a* and a second array 102*b*, the array centers of which are physically separated by at least a correlation distance, which will be understood by one of ordinary skill in the art.

The arrays 102*a*, 102*b* can be any form of arrays formed by a plurality of array elements. For example, the arrays 102*a*, 102*b* can be line arrays, planar arrays, or volumetric arrays, each of which is capable of generating spatial receiving beams. The arrays 102*a*, 102*b* need not be the same form of array. The arrays 102*a*, 102*b* also need not have the same number of acoustic array elements.

Signals 104*aa*-104*a*N from acoustic elements of the first array 102*a* are received and amplified by amplifiers 106*aa*-106*a*N, respectively, resulting in amplified signals 108*aa*-108*a*N. The amplified signals 108*aa*-108*a*N are received by A/D converters 110*aa*-110*a*N, respectively, resulting in intermediate signals 112*aa*-112*a*N, respectively. The intermediate signals 112*aa*-112*a*N are received by a first beam former 114*a*. The first beamformer 114*a* combines the intermediate signals 112*aa*-112*a*N so as to generate a first beamformed signal 116*a*, which is comprised of digital time samples $x_1(t)$ (referred to herein as a first electrical signal) representative of a sound signal received by the first array 102*a* from a first (beam formed) spatial direction.

Similarly, signals 104*ba*-104*b*M from acoustic elements of the second array 102*b* are received and amplified by amplifiers 106*ba*-106*b*M, respectively, resulting in amplified signals 108*ba*-108*b*M. The amplified signals 108*ba*-108*b*M are received by A/D converters 110*ba*-110*b*M, respectively, resulting in intermediate signals 112*ba*-112*b*M, respectively. The intermediate signals 112*ba*-112*b*M are received by a second beam former 114*b*. The second beam former 114*b* combines the intermediate signals 112*ba*-112*b*M so as to generate a second beamformed signal 116*b*, which is comprised of digital time samples $x_2(t)$ (referred to herein as a second electrical signal) representative of a sound signal received by the second array 102*b* from a second (beamformed) spatial direction.

The first and second spatial directions can be the same spatial directions, or they can be different spatial directions. In some arrangements, the first and second spatial directions are changed from time to time, for example, during sequential processing cycles, so that the system 100 processes signals from a first pair of spatial directions, then from another pair of spatial directions, and so fourth.

It will be apparent that the first and second electrical signals 116*a*, 116*b* ($x_1(t)$ and $x_2(t)$), respectively, are processed by the same elements 64-88 described above in conjunction with FIG. 2, and therefore, those elements are not discussed again.

It should be appreciate from the discussion of FIGS. 2 and 2A that a system can be constructed, which has one omnidirectional sound sensor, e.g. 52*a* or 52*b* of FIG. 2, in combination with one array, e.g., 102*a*, or 102*b*. Therefore, in one arrangement, the array 102*a*, the amplifiers 106*aa*-106*a*N, the A/D converters 108*aa*-108*a*N and the beamformer 114*a* can be replaced by the sound sensor 52*a*, the amplifier 56*a*, and the A/D converter 60*a* of FIG. 2. In another arrangement, the array 102*b*, the amplifiers 106*ba*-106*b*M, the A/D converters 108*ba*-108*b*M and the beam former 114*b* can be replaced by the sound sensor 52*b*, the amplifier 56*b*, and the A/D converter 60*b* of FIG. 2.

Figure 2B:
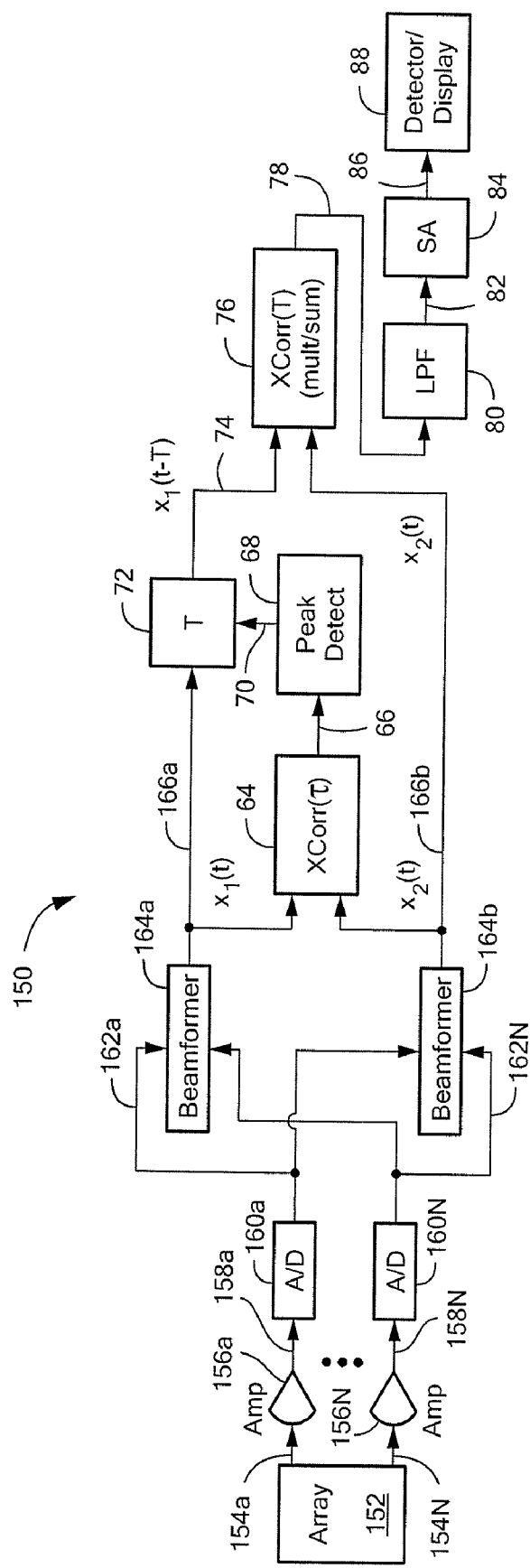
FIG. 2B is a block diagram showing a system having one array, the system adapted to perform dual-channel modulation detection (DCMD)

Referring now to FIG. 2B, in which like elements of FIG. 2 are shown having like reference designations, a system 150 includes by one array 152. The array 152 can be any form of array formed by a plurality of array elements. For example, the array 152*a* can be a line array, a planar array, or a volumetric array, each of which are capable of generating spatial receiving beams.

Signals 154*a*-154N from acoustic elements of the first array 152 are received and amplified by amplifiers 156*a*-156N, respectively, resulting in amplified signals 158*a*-158N. The amplified signals 158*a*-158N are received by A/D converters 160*a*-160N, respectively, resulting in intermediate signals 162*a*-162N, respectively. The intermediate signals 162*a*-162N are received by a first beamformer 164*a*. The first beamformer 164*a* combines the intermediate signals 162*a*-162N so as to generate a first beam formed signal 166*a*, which is comprised of digital time samples $x_1(t)$ (referred to herein as a first electrical signal) representative of a sound signal received by the array 152 from a first (beamformed) spatial direction. The intermediate signals 162*a*-162N are also received by a second beamformer 164*b*. The second beamformer 164*b* combines the intermediate signals 162*a*-162N so as to generate a second beamformed signal 166*b*, which is comprised of digital time samples $x_2(t)$ (referred to herein as a second electrical signal) representative of a sound signal received by the array 152 from a second (beamformed) spatial direction.

The first and second spatial directions can be the same spatial direction or different spatial directions. In some arrangements, the first and second spatial directions are changed from time to time, for example, during sequential processing cycles, so that the system 150 processes signals from a first pair of spatial directions, then from another pair of spatial directions, and so forth.

It will be apparent that the first and second electrical signals 166*a*, 166*b* ($x_1(t)$ and $x_2(t)$), respectively, are processed by the same elements 64-88 described above in conjunction with FIG. 2, and therefore, those elements are not discussed again.

Figure 3:
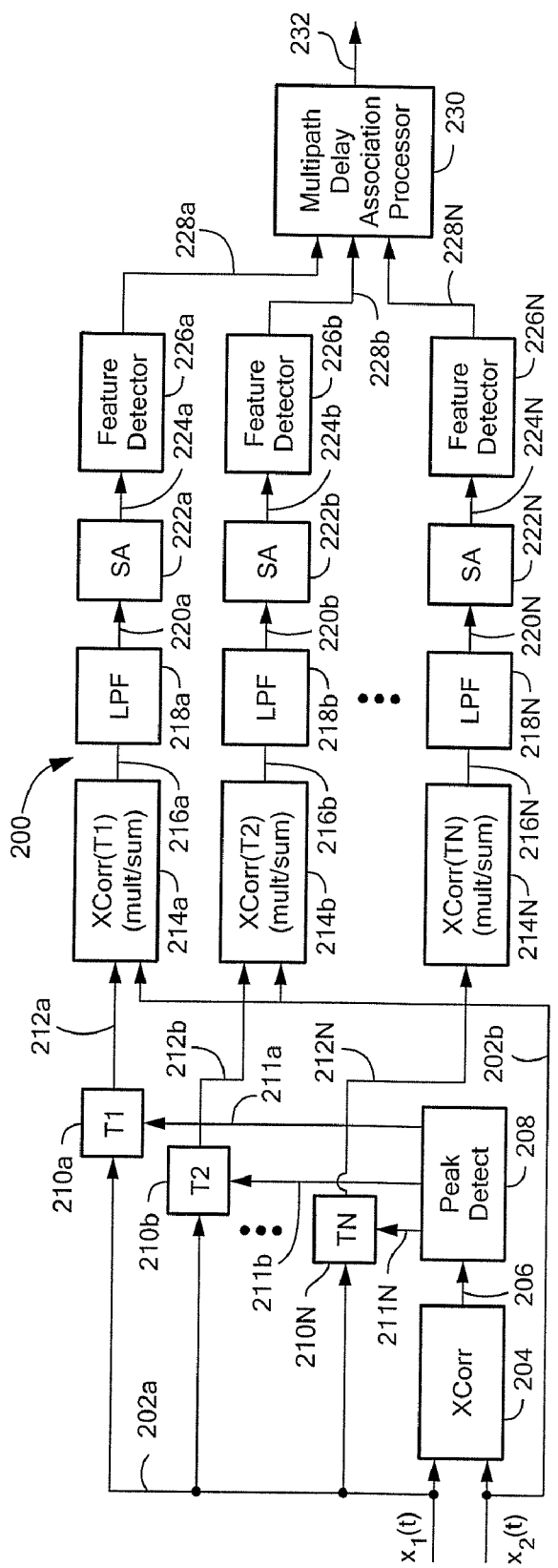
FIG. 3 is a block diagram showing a portion of a system adapted to perform dual-channel modulation detection (DCMD) and also having a feature detector and a multipath delay association processor.

Referring now to FIG. 3, the first and second electrical signals, $x_1(t)$ and $x_2(t)$ of any of the above-described systems 50, 100, 150 of FIGS. 2, 2A, and 2B, respectively, can be processed by the system portion 200, instead of or in addition to the system portions shown in those figures. The signals $x_1(t)$ and $x_2(t)$ can be received by a cross-correlation module 204, the same as or similar to the cross-correlation module 64 of FIGS. 2-2B. The cross-correlation module 204 generates a correlation signal 206 accordingly. The correlation signal is received by a peak detector module 208. The peak detector module is adapted to identify two or more peaks in the correlation signal 206, unlike the peak detector modules 68 of FIGS. 2-2B, which, some embodiments, identifies only a largest correlation peak. In some arrangements, the peak detector module 208 uses a threshold, and portions of the correlation signal 206 that are above the threshold are deemed to be con-elation peaks.

As will be understood, each identified correlation peak is associated with a time delay, here T1, T2, . . . TN. Time delay signals 211a-211N generated by the peak detector module 208 are applied to time delay modules 210a-210N, respectively, and the time delay modules 210a-210N apply time delays T1-TN, respectively, to the first electric signal 202a, resulting in time delayed first electrical signals 212a-212N, respectively.

The time delayed first electrical signals 212a-212N and the second electrical signal 202b are received by respective cross-correlation modules 214a-214N. The cross-correlation modules 214a, 214N each operate with only one correlation time delay. Therefore, the cross correlation modules 214a-214n operate as multiplication and summing (multiplication/summing) modules 214a-214N, respectively, each one of which multiplies and sums respective values in a process the same as or similar to that described above for the multiplication/summing module 76 of FIG. 2, resulting in summed-product signals 216a-216N, respectively, each having a respective plurality of summed-product values.

The summed-product signals 216a-216N can be received by optional low pass filter modules 218a-218N, respectively, which can generate filtered signals 220a-220N, respectively. The filtered signals 220a-220N, or in other arrangements, the summed-product signals 216a-216N, can be received by spectrum analyzers 222a-222N, respectively. The spectrum analyzers 222a-222N can generate frequency domain signals 224a-224N (or frequency spectra), respectively. The frequency domain signals 224a-224N can be received by feature detectors 226a-226N, respectively. Each one of the feature detectors 226a-226N can identify one or more features (e.g., spectral lines) in a respective frequency domain signal 224a-224N, resulting in feature signals 228a-228N, respectively. A multipath delay association processor 230 can receive two or more of the feature signals 228a-228N.

Operation of the multipath delay association processor 230 will be better understood from the discussion below in conjunction with FIG. 4. However, let it suffice here to say that the delay association processor 230 can identify similarities among the feature signal 228a-228N, and therefore, can identify which of the frequency spectra 224a-224N were likely to have originated from the same vessel. The multipath delay association processor can generate an association signal 232 accordingly, which can be used by further processing (not shown) in order to detect, localize, and classify the vessel.

The multipath delay association processor 230 can also apply Doppler corrections to the feature signals 228a-228N. The Doppler corrections are discussed more fully below in conjunction with FIG. 4.

Figure 3A:
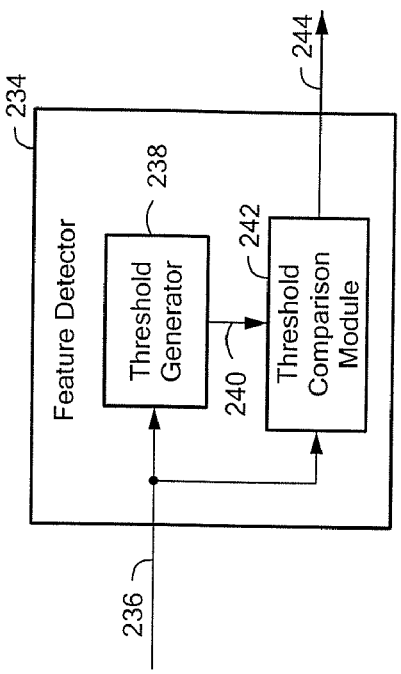
FIG. 3A is a block diagram showing further details of the feature detector of FIG. 3.

Referring now to FIG. 3A, a feature detector 234 can be the same as or similar to one of the feature detectors 226a-226N of FIG. 3. The feature detector 234 can include a threshold generator 238 coupled to receive a frequency domain signal 236, which can be the same as or similar to one of the frequency domain signals 224a-224N of FIG. 3. The threshold generator 238 can generate a threshold signal 240. A threshold comparison module 240 can receive the threshold signal 240 and the frequency domain signal 236 and can compare the frequency domain signal 236 with the threshold signal 240, resulting in a feature signal 244, which can be the same as or similar to one of the feature signals 228a-228N of FIG. 3.

The threshold generator 238 can select a threshold in a variety of ways. For example, the threshold generator 238 can select a signal threshold level based upon an average of the frequency domain signal 236. In other arrangements, the threshold generator 238 can select a threshold to be a predetermined number of decibels above the frequency domain signal (excluding spectra line or features) across a frequency band. In yet other arrangements, the threshold generator 238 can select a threshold to be a predetermined number of decibels above the frequency domain signal (excluding spectra line or features) across a frequency band (e.g., one to ten Hz) and another predetermined number of decibels above the frequency domain signal in another frequency band (e.g., ten to twenty Hz). In some arrangements, the above-described predetermined numbers of decibels are statically defined and in other arrangements, the predetermined numbers of decibels are dynamically defined. For example, the predetermined numbers of decibels can be related to a variance across a band of the frequency domain signal 236, such that a higher variance results in a higher predetermined number of decibels.

Figure 4:
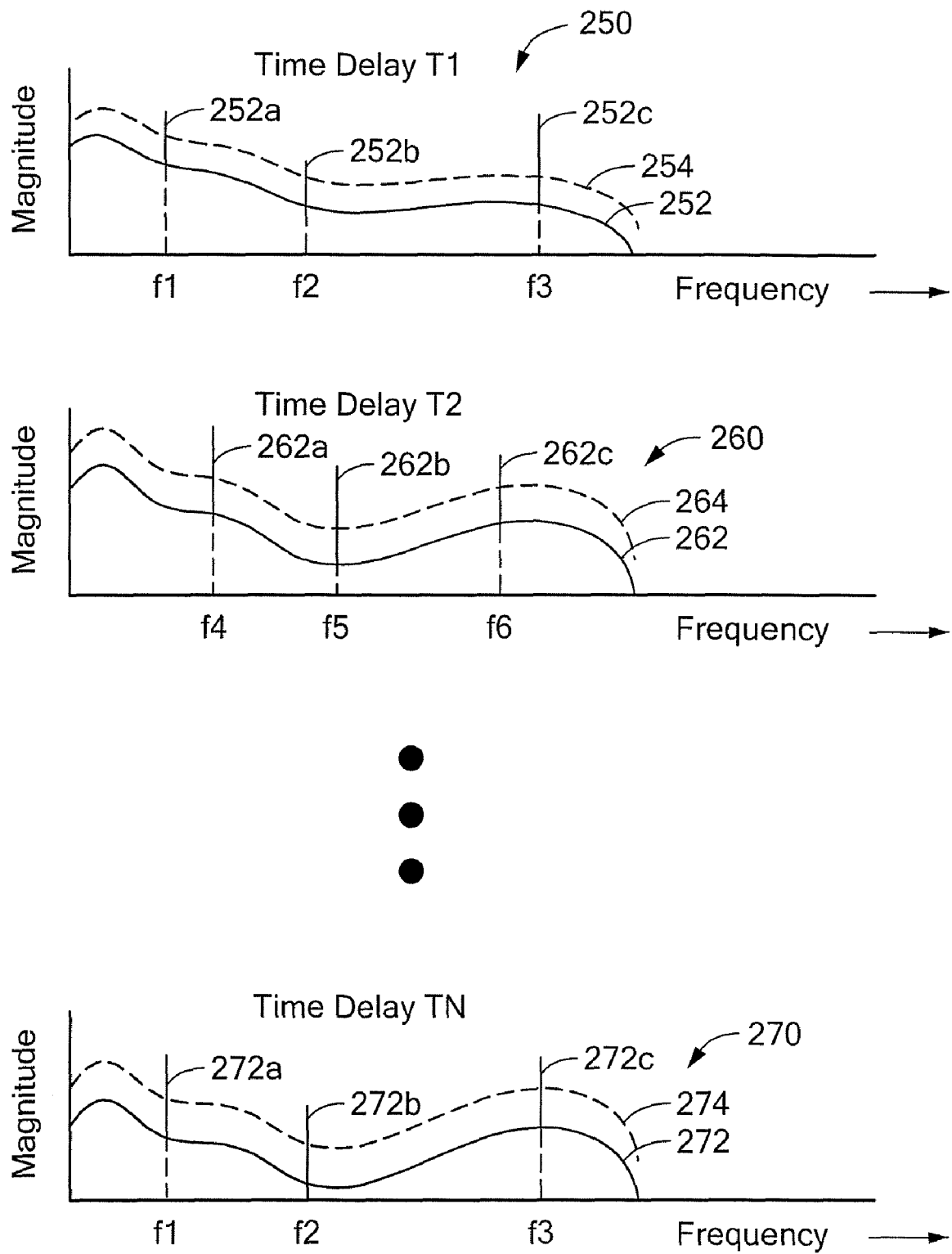
FIG. 4 is a series of graphs showing frequency spectra associated with the system of FIG. 3.

Referring now to FIG. 4, graphs 250, 260, 270 include horizontal scales in units of frequency in Hz and vertical scales in units of amplitude in arbitrary units. A curve 252 is indicative of a frequency domain signal, for example, the frequency domain signal 224a of FIG. 3. A curve 264 is indicative of a threshold generated by and used by the feature detector 226a of FIG. 3. Spectral lines 252a, 252b, 252c are indicative of features detected by the feature detector 226a, which are above the threshold 254.

A curve 262 is indicative of another frequency domain signal, for example, the frequency domain signal 224b of FIG. 3. A curve 264 is indicative of another threshold generated by and used by the feature detector 226b of FIG. 3. Spectral lines 262a, 262b, 262c are indicative of features detected by the feature detector 226b, which are above the threshold 264.

A curve 272 is indicative of another frequency domain signal, for example, the frequency domain signal 224N of FIG. 3. A curve 274 is indicative of another threshold generated by and used by the feature detector 226N of FIG. 3. Spectral lines 272a, 272b, 272c are indicative of features detected by the feature detector 226N, which are above the threshold 274.

It will be apparent that the features 252a, 252b, 252c, which occur at frequencies f1, f2, and f3, have similarity to the features 272a, 272b, 272c, which can also occur at (or near) the frequencies f1, f2, and f3. Therefore, the multipath delay association processor 280 of FIG. 3 can identify that the two spectra 252 and 272 likely originated from the same vessel, whereas the spectrum 262, which has spectral lines at different frequencies, did not.

The frequencies of the features 252a, 252b, 252c need not be at exactly the same frequency as the features 272a, 272b, 272c in order to identify that sound signal associated with the features 252a, 252b, 252c originated from the same vessel as the features 272a, 272b, 272c. For example, in some arrangements, a calculated or predetermined frequency ratio threshold is used, so that the features 252a, 252b, 252c are deemed to have come from the same vessel as the features 272a, 272b, 272c if frequency ratios between corresponding features (252a and 272a, 252b and 272b, 252c and 272c) are less than the calculated or predetermined frequency ratio threshold. In some arrangements, more than one calculated or predetermined frequency ratio threshold is used, so that the frequency ratios between features 252a and 272a, 252b and 272b, 252c and 272c must meet different threshold criteria in order to deem that the spectra 252 and 272 originated from the same vessel. Use of calculated or predetermined frequency ratio thresholds is particularly useful in view of Doppler shifts and corrections thereof described more fully below.

It will be appreciated that each one of the spectra 252, 262, 272 can be associated with a particular respective time delay. For example, the spectrum 252 can be associated with the time delay T1 of FIG. 3, the spectrum 262 can be associated with the time delay T2, and the spectrum 272 can be associated with the time delay TN. It will be further understood that each one of the time delays T1-TN of FIG. 3 is associated with a particular propagation path of sound as it traverses from a vessel to one of the systems 50, 100, 150, 200 of FIG. 2, 2A, 2B, or 3.

As is known, sound travels in a variety of paths as it traverses through water. For example, on a direct path, D, the sound travels directly from a source to a receiver. On a surface reflected path (SR), the sound travels from the source to the ocean surface, where it generally reflects, traveling downward to the sound receiver. On a bottom reflected path, BR, the sound travels from the source to the ocean bottom, where it generally reflects, traveling upward to the sound receiver. On each path, the sound experiences a different time delay and possibly a phase shift. Knowledge of the relative time delays may be used to identify a depth of the sound source, i.e., and the vessel. Therefore, knowledge of the time delays, the associated propagation paths, and the associated receive angles of sound propagating from the vessel to the sound receiver can be used not only to distinguish a submarine from a surface vessel, but also to localize a depth, and in some cases, a range, to the vessel.

Some methods and systems that can be used to localize the vessel in range and/or in depth are described, for example in U.S. patent application Ser. No. 11/422,435, entitled Methods and Systems for Passive Range and Depth Localization, filed Jun. 6, 2006, which application is incorporated herein by reference in its entirety.

While the spectral lines at the frequencies f1, f2, and f3 in the spectrum 252 are shown to be the same frequencies f1, f2, and f3 in the spectrum 272, it should be recognized that the frequencies, which arrive on different sound paths and therefore on different angles, may be differently affected by Doppler shift resulting from a relative speed between the detected vessel and the platform on which the systems 50, 100, 150, or 200 are disposed. It will also be understood that an absolute frequency shift due to the Doppler effect is proportional to the frequency of a feature. However, because the multipath delay association processor 230 of FIG. 303 has knowledge of the spectral feature time delays, the associated sound propagation paths, and therefore, the arrival angle of the sound on the sound paths, in some arrangements, the multipath delay association processor 230 operates to adjust the feature signals 228a-228N according to one or more estimated relative speeds between the detected vessel and the platform on which the sonar system is disposed. For each estimated relative speed, the frequency of the adjusted spectral features can be compared.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of processing sound, comprising:
   receiving the sound with one or more sound sensors;
   converting the received sound to first and second electrical signals;
   correlating the first and second electrical signals to provide a correlation signal;
   identifying a peak in the correlation signal;
   identifying a time delay associated with the peak in the correlation signal;
   applying the time delay to the first electrical signal to provide a first time-delayed electrical signal;
   multiplying portions of the second electrical signal by respective portions of the first time-delayed electrical signal to provide respective pluralities of product values;
   calculating respective sums of each one of the pluralities of product values to provide a plurality of summed-product values; and
   converting the plurality of summed-product values to a frequency domain signal.

2. The method of claim 1, wherein the one or more sound sensors comprise two physically separated sound sensors, each having a generally omnidirectional beampattern.

3. The method of claim 1, wherein the one or more sound sensors comprise an array of sound sensors.

4. The method of claim 3, wherein the converting the received sound to first and second electrical signals comprises:
   converting the received sound to two or more intermediate electrical signals; and
   beamforming by combining selected ones of the two or more intermediate electrical signals to provide at least one of the first electrical signal or the second electrical signal.

5. The method of claim 4, wherein the one or more sound sensors comprise two physically separated arrays, each having two or more sound sensors, wherein the first electrical signal is associated with a first beam steer angle, and wherein the second electrical signal is associated with the first beam steer angle.

6. The method of claim 4, wherein the first electrical signal is associated with a first beam steer angle and wherein the second electrical signal is associated with a second different beam steer angle.

7. The method of claim 4, wherein the first electrical signal is associated with a first beam steer angle and wherein the second electrical signal is associated with the first beam steer angle.

8. The method of claim 4, wherein the one or more sound sensors comprise:
   a single sound sensor having a generally omnidirectional beampattern used to provide the first electrical signal; and
   an array of sound sensors physically separated from the single sound sensor and used to provide the second electrical signal.

9. The method of claim 1, further comprising:
identifying a second peak in the correlation signal;
identifying a second time delay associated with the second peak in the correlation signal;
applying the second time delay to the first electrical signal to provide a second time-delayed electrical signal;
multiplying portions of the second electrical signal by respective portions of the second time-delayed electrical signal to provide second respective pluralities of product values;
calculating respective sums of each one of the second pluralities of product values to provide a second plurality of summed-product values;
converting the second plurality of summed-product values to a second frequency domain signal;
detecting a first feature in the first frequency domain signal;
detecting a second feature in the second frequency domain signal; and
comparing the first feature with the second feature.

10. The method of claim 9, wherein the detecting the first feature comprises:
generating a first threshold associated with the first frequency domain signal; and
comparing the first frequency domain signal with the first threshold to detect the first feature, and wherein the detecting the second feature comprises:
generating a second threshold associated with the second frequency domain signal; and
comparing the second frequency domain signal with the second threshold to detect the second feature.

11. The method of claim 9, wherein the comparing the first feature with the second feature comprises:
identifying a first frequency associated with the first feature;
identifying a second frequency associated with the second feature;
comparing the first frequency with the second frequency to generate a frequency ratio; and
if the frequency ratio is less than or equal to a frequency ratio threshold, associating the first time delay and the second time delay with the same sound source and associating the first time delay with a first sound propagation path and the second time delay with a second sound propagation path between the same sound source and the one or more sound sensors.

12. The method of claim 9, wherein the comparing the first feature with the second feature comprises:
identifying a first frequency associated with the first feature;
identifying a second frequency associated with the second feature;
adjusting at least one of the first frequency or the second frequency in accordance with a Doppler shift to provide at least one of a first corrected frequency or a second corrected frequency;
comparing at least one of the first corrected frequency with the second corrected frequency, the first corrected frequency with the second frequency, or the first frequency with the second corrected frequency to generate a frequency ratio; and
if the frequency ratio is less than or equal to a frequency ratio threshold, associating the first time delay and the second time delay with the same sound source and associating the first time delay with a first sound propagation path and the second time delay with a second sound propagation path between the same sound source and the one or more sound sensors.

13. An apparatus for processing sound, comprising:
one or more sound sensors adapted to receive the sound signal;
a converter coupled to the one or more sound sensors and adapted to convert the received sound to first and second electrical signals;
a correlator adapted to correlate the first and second electrical signals to provide a correlation signal;
a correlation peak detector adapted to identify a first peak and a first time delay associated with the first peak in the correlation signal;
at least one time delay module adapted to apply the first time delay to the first electrical signal to provide a first time-delayed electrical signal;
at least one multiplication/summing module adapted to multiply portions of the second electrical signal by respective portions of the first time-delayed electrical signal to provide respective pluralities of product values and adapted to calculate respective sums of each one of the pluralities of product values to provide a plurality of summed-product values; and
at least one spectrum analyzer adapted to convert the plurality of summed-product values to a frequency domain signal.

14. The apparatus of claim 13, wherein the one or more sound sensors comprise two physically separated sound sensors, each having a generally omnidirectional beampattern.

15. The apparatus of claim 13, wherein the one or more sound sensors comprise an array of sound sensors.

16. The apparatus of claim 15, wherein the converter is adapted to convert the received sound to two or more intermediate signals, and wherein the converter comprises:
at least one beamformer adapted to combine selected ones of the two or more intermediate electrical signals to provide at least one of the first electrical signal or the second electrical signal.

17. The apparatus of claim 16, wherein the one or more sound sensors comprise two physically separated arrays, each having two or more sound sensors, wherein the first electrical signal is associated with a first beam steer angle, and wherein the second electrical signal is associated with the first beam steer angle.

18. The apparatus of claim 16, wherein the first electrical signal is associated with a first beam steer angle and wherein the second electrical signal is associated with a second different beam steer angle.

19. The apparatus of claim 16, wherein the first electrical signal is associated with a first beam steer angle and wherein the second electrical signal is associated with the first beam steer angle.

20. The apparatus of claim 16, wherein the one or more sound sensors comprise:
a single sound sensor having a generally omnidirectional beampattern used to provide the first electrical signal; and
an array of sound sensors physically separated from the single sound sensor and used to provide the second electrical signal.

21. The apparatus of claim 13, wherein the correlation peak detector is further adapted to identify a second peak and a second time delay associated with the second peak in the correlation signal, wherein the at least one time delay module is further adapted to apply the second time delay to the first electrical signal to provide a second time-delayed electrical signal, wherein the at least one multiplication/summing module is further adapted to multiply portions of the second electrical signal by respective portions of the second time-delayed electrical signal to provide second respective pluralities of product values and further adapted to calculate respective sums of each one of the second pluralities of product values to provide a second plurality of summed-product values, wherein the at least one spectrum analyzer is further adapted to convert the second plurality of summed-product values to a second frequency domain signal, wherein the apparatus further comprises:

- at least one feature detector adapted to detect a first feature in the first frequency domain signal and adapted to detect a second feature in the second frequency domain signal; and
- a multipath delay association processor adapted to compare the first feature with the second feature.

22. The apparatus of claim 21, wherein at least one feature detector comprises:

- at least one threshold generator adapted to generate a first threshold associated with the first frequency domain signal and a second threshold associated with the second frequency domain signal; and
- at least one threshold comparison module adapted to compare the first frequency domain signal with the first threshold to detect the first feature and adapted to compare the second frequency domain signal with the second threshold to detect the second feature.

23. The apparatus of claim 21, wherein the multipath delay association processor is further adapted to identify a first frequency associated with the first feature, to identify a second frequency associated with the second feature, to compare the first frequency with the second frequency to generate a frequency ratio, and, if the frequency ratio is less than or equal to a frequency ratio threshold, the multipath delay association processor is further adapted to associate the first time delay and the second time delay with the same sound source and further adapted to associate the first time delay with a first sound propagation path between the same sound source and the one or more sound sensors and to associate the second time delay with a second sound propagation path between the same sound source and the one or more sound sensors.

24. The apparatus of claim 21, wherein the multipath delay association processor is further adapted to identify a first frequency associated with the first feature, to identify a second frequency associated with the second feature, to adjust at least one of the first frequency or the second frequency in accordance with a Doppler shift to provide at least one of a first corrected frequency or a second corrected frequency, to compare at least one of the first corrected frequency with the second corrected frequency, the first corrected frequency with the second frequency, or the first frequency with the second corrected frequency to generate a frequency ratio, and if the frequency ratio is less that or equal to a frequency ratio threshold, the multipath delay associate processor is further adapted to associate the first time delay and the second time delay with the same sound source and associating the first time delay with a first sound propagation path and the second time delay with a second sound propagation path between the same sound source and the one or more sound sensors.

* * * * *

UNITED STATES PATENT AND TRADEMARK OFFICE
CERTIFICATE OF CORRECTION

| | | |
|---|---|---|
| PATENT NO. | : 7,773,458 B2 | Page 1 of 2 |
| APPLICATION NO. | : 12/040123 | |
| DATED | : August 10, 2010 | |
| INVENTOR(S) | : Arnold W. Novick et al. | |

It is certified that error appears in the above-identified patent and that said Letters Patent is hereby corrected as shown below:

Column 1, Line 16 delete "analyzes" and replace with --analyze--.

Column 1, Line 41 delete "able classify" and replace with --able to classify--.

Column 1, Line 53 delete "analog to digital" and replace with --analog-to-digital--.

Column 4, Line 7 delete "analog to digital" and replace with --analog-to-digital--.

Column 4, Lines 14-15 delete "analog to digital" and replace with --analog-to-digital--.

Column 4, Line 24 delete "signal" and replace with --signals--.

Column 4, Line 36 delete "con-elation" and replace with --correlation--.

Column 5, Line 50 delete "beam former" and replace with --beamformer--.

Column 5, Line 56 delete "(beam formed) and replace with --(beamformed)--.

Column 5, Line 64 delete "beam former 114b." and replace with --beamformer 114b.--.

Column 6, Line 10 delete "fourth." and replace with --forth--.

Column 6, Line 15 delete "appreciate" and replace with --appreciated--.

Column 6, Line 29 delete "by one" and replace with --an--.

Column 6, Line 42 delete "beam formed" and replace with --beamformed--.

Column 7, Line 10 delete ", some" and replace with --, in some--.

Signed and Sealed this
Twelfth Day of April, 2011

David J. Kappos
*Director of the United States Patent and Trademark Office*

CERTIFICATE OF CORRECTION (continued)
U.S. Pat. No. 7,773,458 B2

Column 7, Line 14 delete "con-elation" and replace with --correlation--.

Column 7, Line 54 delete "signal" and replace with --signals--.

Column 8, Line 16 delete "line" and replace with --lines--.

Column 8, Line 20 delete "line" and replace with --lines--.

Column 8, Line 24 delete "numbers" and replace with --number--.

Column 8, Line 25 delete "numbers" and replace with --number--.

Column 8, Line 27 delete "numbers" and replace with --number--.

Column 9, Line 22 delete "FIG." and replace with --FIGS.--.

Column 9, Lines 43-44 delete "entitled Methods and Systems for Passive Range and Depth Localization," and replace with --entitled "Methods and Systems for Passive Range and Depth Localization,"--.

Column 9, Line 58 delete "FIG. 303" and replace with --FIG. 3--.

Column 14, Line 23 delete "associate" and replace with --association--.